(12) United States Patent
Zhang et al.

(10) Patent No.: US 11,552,876 B1
(45) Date of Patent: Jan. 10, 2023

(54) REAL-TIME IDENTIFICATION OF NETWORK PREFIX OUTAGE

(71) Applicant: Amazon Technologies, Inc., Seattle, WA (US)

(72) Inventors: Jinbing Zhang, Issaquah, WA (US); Ali Khayam, San Jose, CA (US); Kushal Mall, Issaquah, WA (US); Sammit Kulkarni, Seattle, WA (US); Michael Wan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/094,657

(22) Filed: Nov. 10, 2020

(51) Int. Cl.
*H04L 45/02* (2022.01)
*H04L 45/28* (2022.01)

(52) U.S. Cl.
CPC .............. *H04L 45/04* (2013.01); *H04L 45/02* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 7,823,202 B1* | 10/2010 | Nucci | H04L 45/00 709/224 |
| 9,294,393 B1* | 3/2016 | Mullooly | H04L 47/825 |
| 2006/0203744 A1* | 9/2006 | Patel | H04L 45/04 370/254 |
| 2007/0153763 A1* | 7/2007 | Rampolla | H04L 63/1466 370/351 |
| 2015/0334000 A1* | 11/2015 | Zhang | H04L 45/02 370/254 |

* cited by examiner

*Primary Examiner* — Xavier S Wong
(74) *Attorney, Agent, or Firm* — Klarquist Sparkman, LLP

(57) ABSTRACT

Systems and methods are disclosed for monitoring routing data and issuing alarms for route anomalies detected based on the monitored routing data. Routing data, including Border Gateway Protocol (BGP) announcement and/or withdraw messages for a targeted prefix of an Autonomous System (AS), is collected and analyzed to detect route anomalies. The analysis may include a comparison of the BGP messages to internal routing data. An alarm is selectively output corresponding to the detected route anomalies. The detected route anomalies may be correlated with monitored network traffic data to classify the route anomalies, where the output of the alarm is based on the classification of the route anomalies.

20 Claims, 10 Drawing Sheets

REAL-TIME IDENTIFICATION OF NETWORK PREFIX OUTAGE

BACKGROUND

The Internet includes tens of thousands of autonomously operated networks, called Autonomous Systems (ASs), identified by unique AS numbers (ASN). ASs are connected via dedicated links and they negotiate reachability information using the Border Gateway Protocol (BGP). ASs may include multiple Internet Protocol (IP) routing prefixes under the control of one or more network operators on behalf of a single administrative entity or domain. Accessibility of such an entity or domain may be compromised if other ASs announce or withdraw prefixes under the control of the entity or domain. Performance issues may also be experienced by users seeking to reach the entity or domain if the traffic to an associated prefix is routed over a congested path as a result of route leaks.

DETAILED DESCRIPTION

As described above, routing anomalies and unexpected/unauthorized activities associated with prefixes for Automated Services (ASs) may cause accessibility issues for network domains corresponding to the prefixes. One approach to detect anomalous activities is a Route Hijack Detection System (RHDS), which relies on an external third-party route monitoring service for prefix monitoring. RHDS discovers the prefixes announced by a domain and sends the prefixes to the third-party service periodically. RHDS keeps polling the third-party service for new route hijack alerts every minute. Other approaches perform a more comprehensive check of prefix activity. However, due to the large number of prefixes with which a given domain may be associated, such checks are typically only performed biweekly or monthly, and thus fail to provide real-time monitoring. Without real-time monitoring, domains may be subject to the above-described accessibility issues if prefix-related anomalies occur between checks.

The disclosure provides example approaches to provide a real-time or near-real-time control-plane based routing anomaly detection service that monitors the routing of prefixes associated with a domain, detects routing anomalies, and raises alerts/alarms which provide information for route hijack and route leak auto-mitigation as well as for prefix outage and unexpected prefix activity manual mitigation. In one example, the disclosed system automatically discovers prefixes and continuously collects routing data from publicly available data sources as well as internal data sources. Then, the system analyzes the Border Gateway Protocol (BGP) withdraw and announcement messages in the routing data to identify any changes that fall outside normal patterns. The system may identify whenever monitored prefixes are withdrawn in major networks and users behind these networks cannot access a targeted domain (e.g., a domain that is a subject of monitoring for network anomalies). The system may also detect route leaks of prefixes, or routing misconfigurations that direct other networks' traffic towards the targeted domain. In an example implementation of the system, networking engineers may receive route alarms in near-real time of anomalous activity, including detailed information for mitigation when the monitored prefixes are withdrawn, hijacked, leaked, or non-domain prefixes are announced. By collecting data from multiple data sources, the described systems and methods remove a single point of failure present in other example approaches (e.g., RHDS, described above), thereby providing a more robust monitoring solution that improves route hijack detection source availability. Furthermore, the real-time or near-real-time operation of the disclosed systems and methods decreases domain downtime relative to some example approaches (e.g., the monthly or biweekly monitoring described above).

Figure 1:
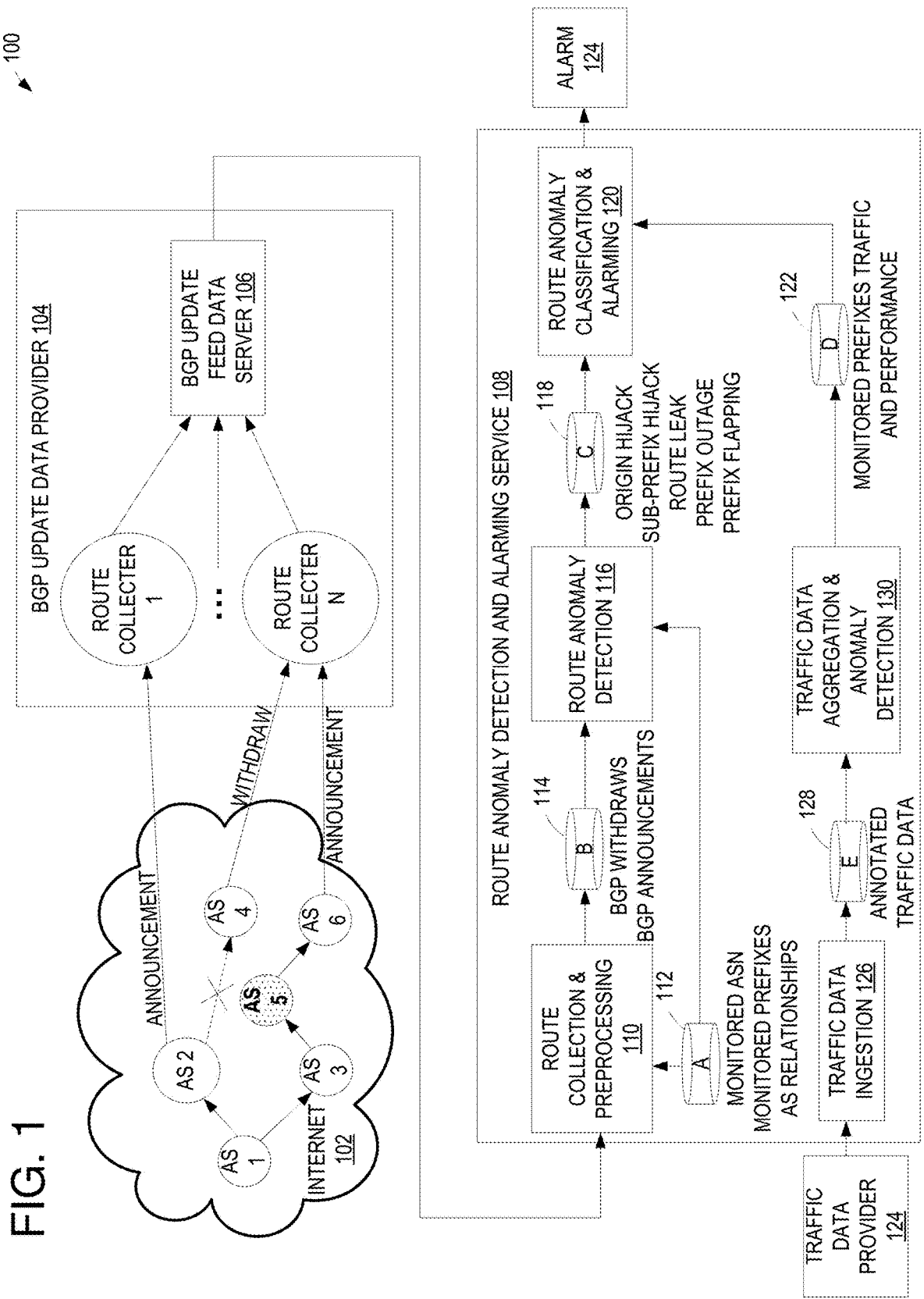
FIG. 1 is an example system diagram showing a routing anomaly detection service.

FIG. 1 shows an example routing anomaly detection service 100 for monitoring routing and network traffic information to detect anomalies and raise alarms related to detected anomalies. An example segment of the Internet is shown at 102, which includes a plurality of Autonomous Systems (ASs) 1-6 for routing data through the Internet. In the illustrated example, AS 1 may issue an announcement to ASs 2 and 3 to identify a prefix that is usable to reach the IP address associated with the domain controlling AS 1. AS 2 may propagate (or attempt to propagate) the announcement to any connected ASs, such as to AS 4 and to route collector 1 (described in more detail below). Similarly, AS 3 may propagate (or attempt to propagate) the announcement to its connected ASs, such as AS 5 (which further propagates the announcement to AS 6).

Under normal BGP operation, the announcement would be propagated through the Internet and detected by a route collector designated for a corresponding AS. For example, in FIG. 1, route collector 1 is shown as collecting information from AS 2 and route collector N is shown as collecting information from AS 4 and AS 6. Route collectors 1 and N, as well as optional additional route collectors are included in BGP update data provider 104. The route collectors are configured to transfer the collected information (e.g., BGP announcement and withdraw messages) to a BGP update feed data server 106.

The example depicted in FIG. 1 also shows some potential issues that may arise in the Internet, which may be detected by the service 100. For example, the link between AS 2 and AS 4 may be disrupted, which does not allow AS 2 to propagate the above-described announcement message for the prefix associated with AS 1. Additionally, AS 5 may be an offending AS that is responsible for performing a hijack maneuver. For example, AS 5 may receive the announcement of the prefix from AS 1 via AS 3, then alter the message to associate itself with the prefix, and propagate an associated announcement message to AS 6 to maliciously indicate that data intended for the prefix of AS 1 should instead be routed to AS 5. Due to the above-described issues, in the illustrated example, the route collector N does not receive the intended announcement message (e.g., as received at route collector 1 from AS 2) for the prefix of AS 1. Instead, the route collector N receives a withdraw message from AS 4 (due to the broken link between AS 4 and AS 2) and a modified announcement message from AS 6 (due to the hijack attempt of AS 5). This raw data is then passed from the route collectors to the BGP update feed data server 106. It is to be understood that the above examples correspond to a snapshot of routing information that is collected by the BGP update data provider 104, and the provider 104 may receive routing information continuously in real-time as BGP messages are transmitted through the Internet 102.

In order to evaluate the raw data collected by the BGP update data provider 104, a route anomaly detection and alarming service 108 is configured to retrieve the collected raw data (and additional internal and/or external data, as will be described below), process the raw data, and perform analysis on the processed data to identify and classify route anomalies, which may trigger an output of an alarm. For example, the service 108 includes a route collection and preprocessing module 110, which is configured to filter the raw data (e.g., to identify routing data relevant to a targeted prefix/domain) and convert the formatting of the raw data to a normalized format in order to homogenize the results. The data processed by the module 110 may include public data (e.g., RIPE RIS raw routing data, RouteViews raw routing data, etc.), such as the data from the BGP update feed data server 106, as well as internal data from a database A 112, which may store information for monitored ASNs, monitored prefixes, and AS relationships. The processed data from module 110 may be stored in a database B 114 as a plurality of BGP withdraw and BGP announcement messages.

As a non-limiting example, Raw Routing Data may be stored with the below folder structure and file name convention:

Data Source Name→Collector Name→YYYY→MM→DD→updates.YYYY.MM.DD.HH.MM.gz

In order to normalize this data, the route collection and preprocessing module 110 may decode the raw routing data files in Multi-Threaded Routing Toolkit (MRT) format, filter out non-targeted BGP updates (e.g., BGP updates for non-targeted ASs/entities), and store the BGP announcement and withdraw messages to a database, such as Amazon Web Services (AWS) DynamoDB. The module 110 may also process the internal routing data from database A 112 to identify what prefixes are being announced to the Internet and store the announced prefixes to an AWS DynamoDB table. BGP announcement and withdraw messages may be persisted in two different DynamoDB tables respectively.

The BGP messages from database B 114, as well as the internal data from database A 112 may be provided to a route anomaly detection module 116, which is configured to compare the BGP messages with the monitored data from database A 112 to detect changes. The data corresponding to those changes is stored in database C 118, and may correspond to origin hijacks, sub-prefix hijacks, route leaks, prefix outages, prefix flapping (e.g., rapid fluctuations between announcements and withdraws for a prefix), and/or other types of anomalies.

A route anomaly classification and alarming module 120 may be configured to analyze the data from database C 118 and identify the urgency and/or efficacy of the anomaly based on a correlation of the route anomalies with monitored prefix traffic and performance data stored in a database D 122. As shown, the monitored traffic and performance data in database 122 may be populated using results of a real-time network monitoring mechanism. In one example, the real-time network monitoring mechanism may collect data from an external traffic data provider 124 via a traffic data ingestion module 126. The traffic data provider 124 may include and/or be coupled to border routers that feed data into a traffic data collection and storage module (e.g., a traffic analyzer, such as NETFLOW). The received raw traffic data may be annotated (e.g., enriched with prefix information) and stored in a database E 128. The annotated traffic data may be processed by a traffic data aggregation and anomaly detection module 130 to identify traffic anomalies, such as changes in traffic and performance on the network (e.g., increase/drop in traffic volume, path changes, latency changes, etc.). For example, the traffic data aggregation and anomaly detection module 130 may aggregate the traffic data from database E 128 based on the prefixes and detect traffic anomalies for each prefix. The traffic data aggregation and anomaly detection module 130 may output the results of the processing to the database D 122 for use in classifying detected anomalies, as will be described in more detail below with respect to FIG. 2.

For anomalies that are classified to be above a threshold level of urgency/efficacy (e.g., anomalies determined to be a real concern according to conditions set by the entity associated with the monitored prefixes), an alarm may be generated and provided to an alarming module 124. In some examples, the module 120 may classify the anomalies based on a number of reports and/or a length of time since a first report of the anomaly. For example, since the anomaly detection of module 116 is performed in real-time, momentary network outages or other temporary issues may be identified as anomalies. However, the anomalies may not be of concern to a controlling entity unless they persist. Accordingly, the module 120 may not classify an anomaly as urgent unless the anomaly is seen to persist for a threshold length of time. The alarming module 124 may be configured to output or otherwise issue an alarm pertaining to identified anomalies, which may include an indication of the type of anomaly, the prefix/AS with which the anomaly is associated, mitigation suggestions, and/or other information.

As an example, given the illustrated issues described above (e.g., a lost connection between AS 2 and AS 4 and the AS 5 hijack attempt), the route anomaly detection module 116 may detect differences in the BGP withdraws/announcements that are indicative of these issues, and store this information (e.g., an indication of the withdraw message from AS 4 and the altered announcement message from AS 6 via AS 5) in the database C 118. If the entity using the service 108 (e.g., the owner of AS 1) is concerned about outages and hijacks, then an alarm relating to the messages may be issued via alarm 124 based on output from route anomaly classification and alarming module 120.

In an illustrative example operation for outputting an alarm, the route anomaly detection module 116 may evaluate the BGP announcements and withdraws messages every 1 minute, generate route alarms, and save them to different route alarm tables based on the alarm types. The route anomaly classification and alarming module 120 may raise a prefix outage alarm if a monitored prefix is withdrawn, as seen by a threshold number of peers, such as more than one peer. The disclosed system also supports allowing a network engineer to whitelist ASNs and blacklist prefixes. The module 120 may raise a route hijack alarm when a monitored prefix or a sub-prefix of a monitored prefix is announced by a non-targeted AS, as seen by a threshold number of peers, such as more than one peer. The module 120 may raise an unexpected prefix activity alarm if any non-targeted prefix is announced by a targeted AS, as seen by a threshold number of peers, such as at least one peer. In the above described examples, the threshold number of peers may be configured by the user. The module 120 may raise a route leak alarm if a targeted entity peer is announcing targeted entity prefixes to its peer or upstream providers. The module 116 may detect this kind of AS path anomaly by evaluating the AS path changes and the AS relationships data. The prefix outage, unexpected prefix activity, route leak, route hijack, and/or other types of alert/alarms may be persisted in different tables (e.g., different DynamoDB tables).

Figure 2:
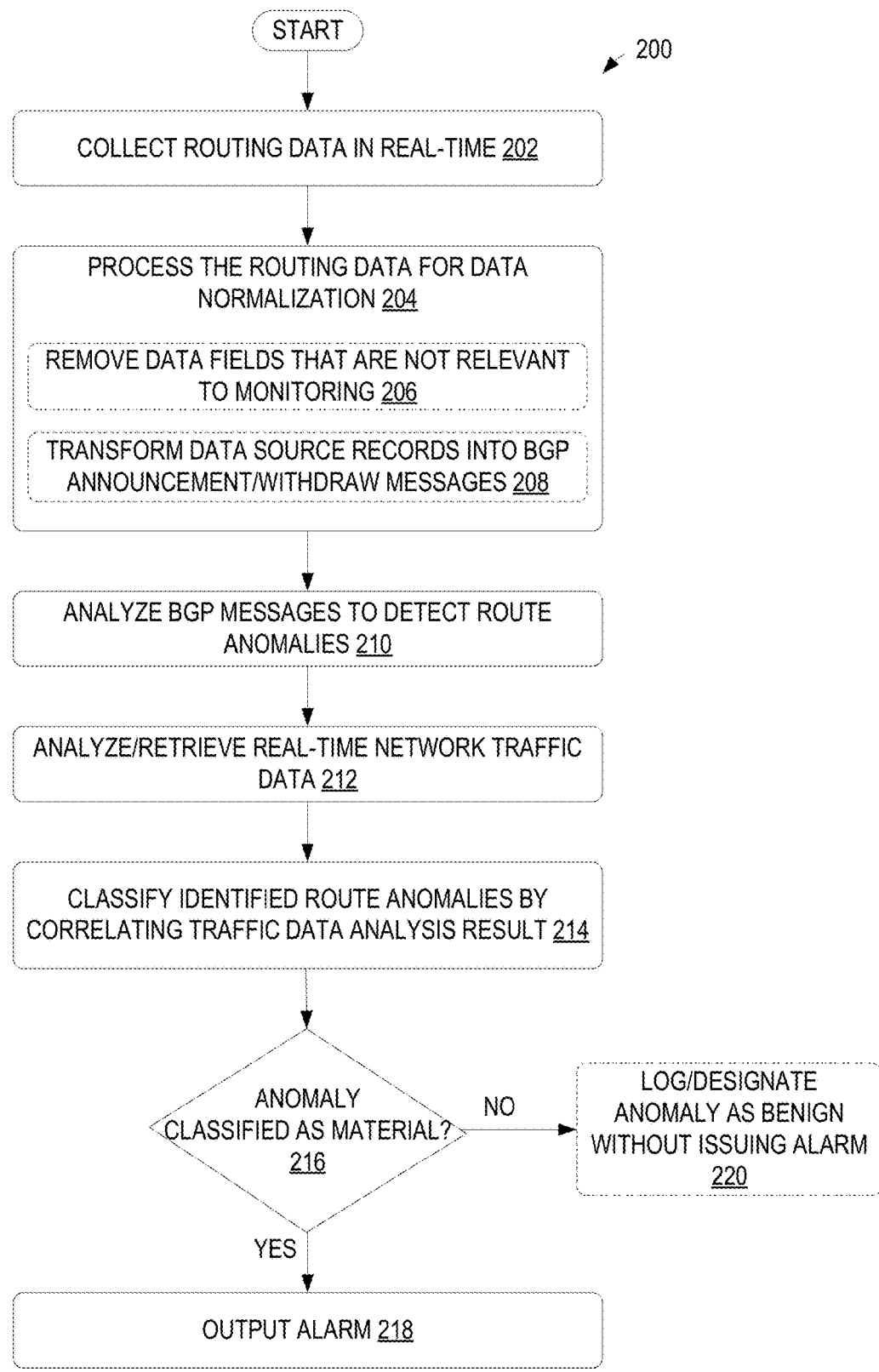
FIG. 2 is a flow chart of an example method for monitoring routing data and detecting routing anomalies.

FIG. 2 shows an example method 200 for monitoring and detecting routing anomalies. Method 200 may be performed by a control-plane based routing anomaly detection service, such as route anomaly detection and alarming service 108 of FIG. 1, in coordination with data sources such as BGP update data provider 106 and/or databases A-D (112, 114, 118, and 122) of FIG. 1. At 202, the method includes collecting routing data. For example, raw routing data may be collected in real time from different data sources. At 204, the method further includes processing the raw routing data for data normalization. For example, the processing may include throwing out data fields that are not required for the targeted analysis, as indicated at 206, and transforming data source records into BGP announcement and BGP withdraw messages in a well-defined schema, as indicated at 208.

As a non-limiting example, a system for performing method 200 may be configured to receive different types of BGP messages, such as OPEN, UPDATE, KEEPALIVE, and NOTIFICATION messages. The system may be configured to immediately filter out messages that do not include relevant information for the described analysis—for example, any OPEN, KEEPALIVE, and NOTIFICATION messages may be filtered out without any further processing. The remaining messages (e.g., UPDATE messages) may be processed further to extract relevant information. For example, UPDATE messages may include three types of information: feasible routes, path attributes, and unfeasible routes. The system may be configured to decode the raw BGP UPDATE messages and remove path attributes like NEXT_HOP, LOCAL_PREF, and/or any other attributes that are not necessarily used for route anomaly detection. The system may also be configured to extract the BGP prefix announcements and BGP prefix withdraws from the raw BGP UPDATE messages.

The extracted BGP announcements and withdraws may be further processed by filtering announcements and withdraws based on a selected scope of monitoring, combining the remaining announcements and withdraws (e.g., announcements and withdraws that are not filtered out) based on targeted information in the remaining announcements and withdraws, and store the result in a data storage layer (e.g., cloud database tables) for route anomaly detection. The targeted information used for the above-described combining may include, for BGP announcements, a timestamp, a prefix, and an AS path to the prefix, and for BGP withdraws, a timestamp and a prefix.

At 210, the method further includes analyzing the processed (e.g., filtered and normalized) BGP announcement and BGP withdraw messages to detect route anomalies. For example, as described in FIG. 1, the BGP messages may be analyzed to detect route anomalies such as origin hijacks, sub-prefix hijacks, route leaks, prefix outages, prefix flapping, and/or other route anomalies. Examples of BGP message information that may be indicative of different types of route anomalies are described in more detail below with respect to FIGS. 3-5. The results and parameters of the analysis may also be fed back into a machine learning algorithm to improve accuracy of the route anomaly detection process.

The method may further include retrieving and/or analyzing network traffic data in real time based on the prefix in the route anomalies, as indicated at 212. For example, as shown and described with respect to FIG. 1, traffic data may be received (e.g., from traffic data provider 124) and processed (e.g., by traffic aggregation and anomaly detection module 130) to determine traffic anomalies that may be used to provide additional context to route anomalies.

At 214, the method may include classifying the route anomaly as a material event (e.g., an event that meets parameters indicating a threshold of concern or intent for a user of the route anomaly detection) or a benign event (e.g., an event that does not meet the parameters indicating the threshold of concern or intent for the user) by correlating traffic data analysis results. For example, as shown and described with respect to FIG. 1, monitored traffic and performance data from database 122 may be used by route anomaly classification and alarming module 120 to classify detected route anomalies.

The route anomalies may be classified by correlating the detected anomalies (e.g., detected at 210) with network traffic and performance data in order to enable the system to detect user impacting events accurately. The following are examples of how network traffic and performance data may be used to detect user impacting events (e.g., determining whether events are classified as "material" at 214). As a first example, when user impacting route leak events occur, traffic changes are generally seen on the network as well as performance degradations. For example, ASNs may be detected as arriving inbound via paths that were not detected before, and the overall latency of the network may increase. This traffic information may be correlated with detected route anomalies to help draw a conclusion regarding whether the route anomaly is a material event. For example, the traffic information may be compared to thresholds corresponding to normal/expected fluctuations, and any traffic parameters that exceed such thresholds may increase an estimated likelihood that a corresponding route anomaly (e.g., detected while the traffic parameters are present) is a material event. The thresholds may be configurable by the user in order to capture the user's intent for route anomaly detection.

As another example, when user impacting prefix outage events occur, traffic may be seen as disappearing from impacted ASNs. Accordingly, in such examples, an alarm may not be raised (e.g., a route anomaly may be classified as benign instead of material) if prefix outage anomalies are detected without corresponding detections of traffic drops.

As still another example, network traffic volume may be used to quantify user impact. For example, a user network with top traffic volume may have lower thresholds to be considered as impacted (e.g., having events that are classified as material) than networks with small or zero traffic.

As indicated at 216, the method includes determining (e.g., for each anomaly identified at 214) if the route anomaly is classified as material (e.g., based on the classification performed at 214). If the anomaly is classified as material (e.g., "YES" at 216), the method includes outputting one or more alarms, as indicated at 218. The alarm(s) may be output along with, or otherwise include, annotated user impact information, the event location information, and/or other information associated with the anomaly. If the anomaly is not classified as material (e.g., "NO" at 216), an alarm may not be raised, and the method may optionally log and/or designate the anomaly as benign. The results and parameters of the classification may also be fed back into a machine learning algorithm to improve accuracy of the route anomaly detection and classification process.

Figure 3:
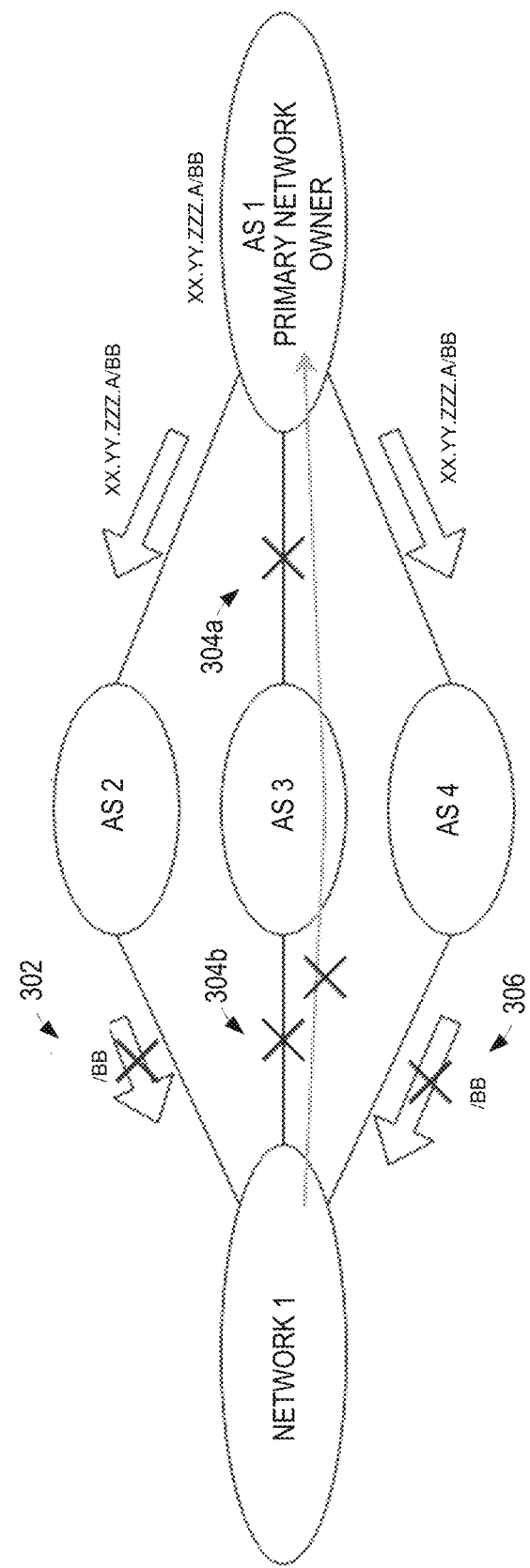
FIGS. 3-6 schematically depict example scenarios relating to different use cases for the disclosed routing anomaly detection systems and methods.

As described above, the route anomaly detection module 116 of FIG. 1 may detect different kinds of route anomalies and store indications of the anomalies accordingly. For visualization purposes, FIGS. 3-6 show example scenarios relating to different use cases for the disclosed routing anomaly detection systems and methods. FIG. 3 shows an example of a prefix outage scenario, in which a monitored prefix is no longer reachable on the Internet.

As shown in FIG. 3, AS 1 propagates a BGP announcement message to all connected ASs for the prefix/BB. However, due to a confluence of network events, the announcement message is not propagated to Network 1. For example, AS 2 may not propagate the/BB prefix by design (as indicated at 302, traffic may be shifted off of AS 3 resulting in a loss of connection between AS 1 and Network 1 through AS 3, as indicated by the interrupted links at 304a and 304b, and AS 4 may unexpectedly not propagate the announcement message as indicated at 306. Accordingly, the/BB prefix may be withdrawn at Network 1. The routing messages leading up to and including this withdraw, as well as real-time monitored network traffic, may be analyzed by the described route anomaly detection systems and methods (e.g., described with respect to FIGS. 1, 2, 7, and 8) to determine whether the resulting prefix outage is to be classified highly enough to cause an alarm to be issued.

Figure 4:
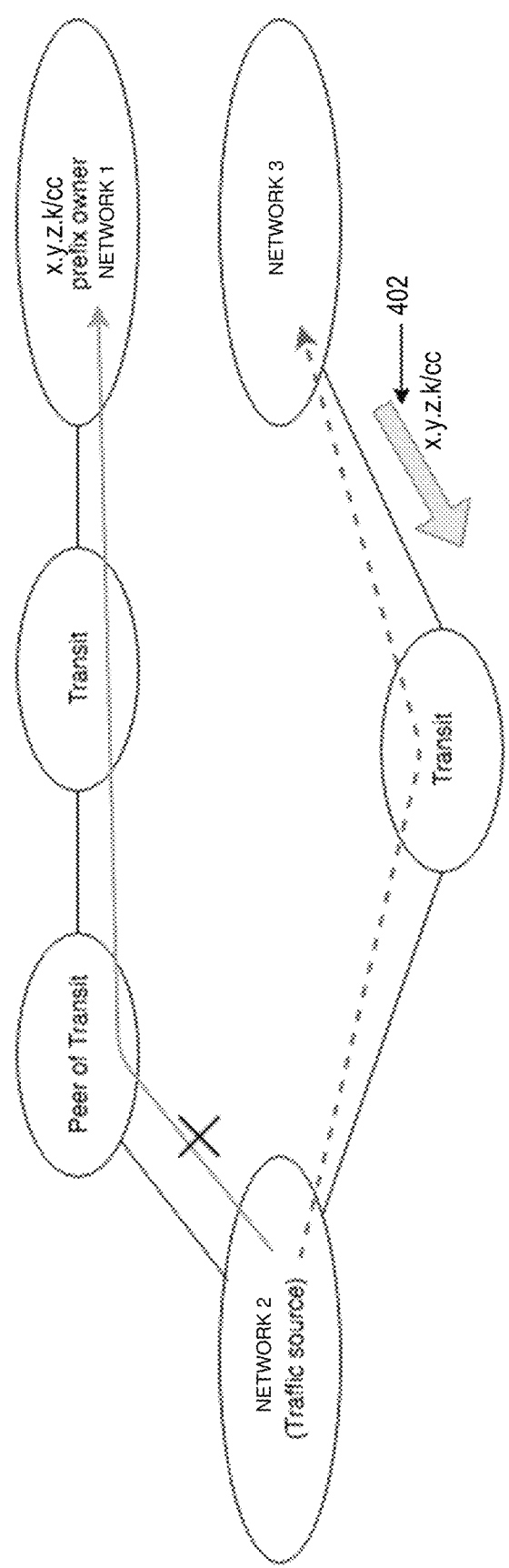

FIG. 4 shows an example of a hijack scenario, in which a prefix that is not owned by a targeted domain is seen advertised by ASNs owned by the targeted domain. For example, as shown, network 1 owns the prefix/cc, such that, in a typical operation, traffic from network 2 targeting prefix/cc would be routed to network 1. However, in the illustrated hijack scenario, network 3 advertises the/cc prefix, as shown at 402, which would cause future traffic from network 2 to be routed to network 3 instead of network 1. The described route anomaly detection systems and methods (e.g., shown in FIGS. 1, 2, 7, and 8) may detect this anomaly by identifying the announcement message sent at 402 to be changed from the previous announcement message sent from network 1.

Figure 5:
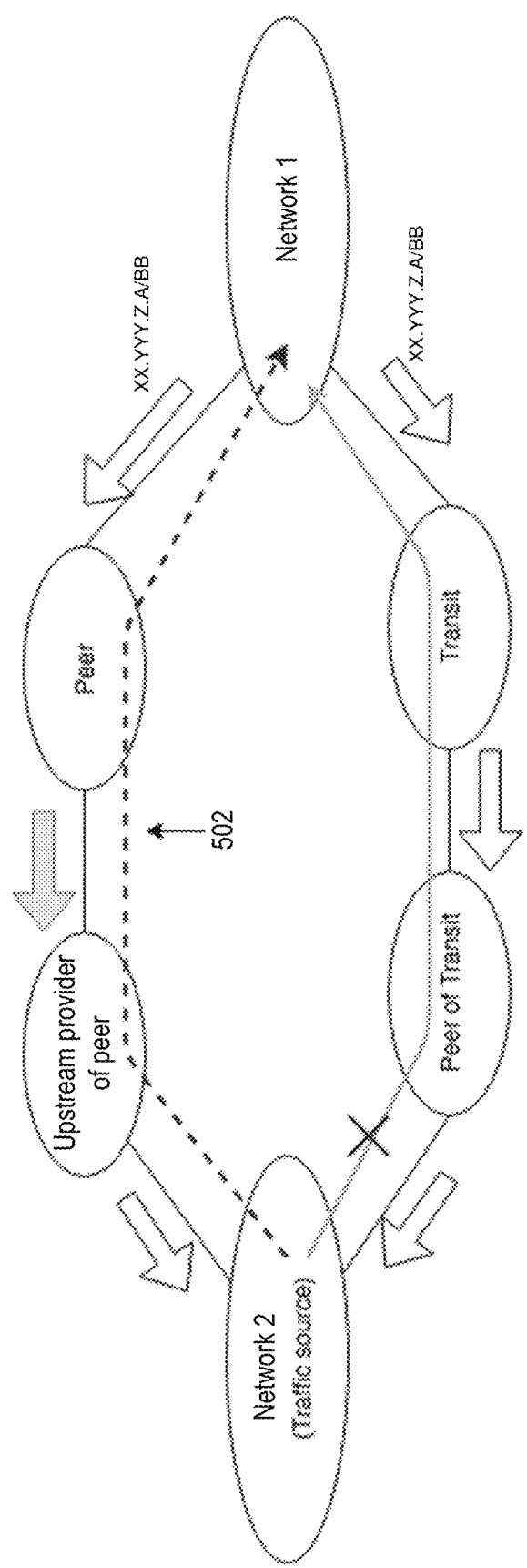

FIG. 5 shows an example of a route leak scenario, in which one or more unexpected AS paths to a targeted domain's prefixes are detected. For example, as shown, network 1 issues announcements for prefix/BB to a peer and a transit entity. The transit entity may be expected to propagate the announcement message to network 2 (e.g., a traffic source) in order to create a BGP path to network 1 for prefix/BB. However, according to the network policies, the peer is not expected to propagate the announcement message to an upstream provider. Accordingly, the resulting BGP path 502 is unexpected and may be detected as a route anomaly by the described route anomaly detection systems and methods (e.g., shown in FIGS. 1, 2, 7, and 8) by analyzing the announcement messages received at network 2.

Figure 6:
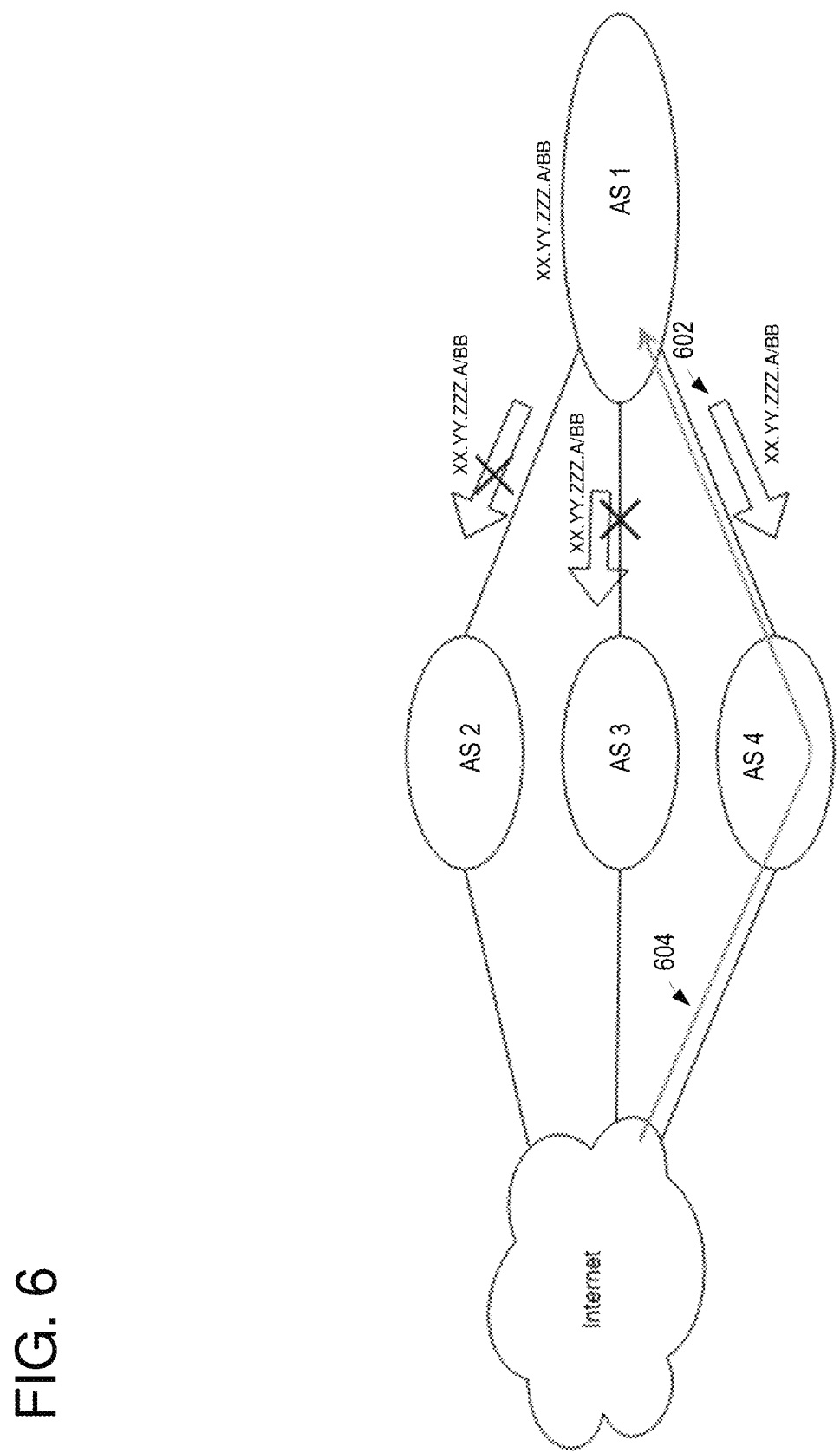

FIG. 6 shows an example of a single-upstream-provider scenario, in which only one single upstream adjacent transit provider AS is detected announcing a route to a monitored prefix. For example, as shown at 602, network 1 only sends an announcement message for prefix/BB to AS 4. As a result, AS 4 is the only transit provider propagating the/BB prefix to the Internet, as shown by the path indicated at 604.

Figure 7:
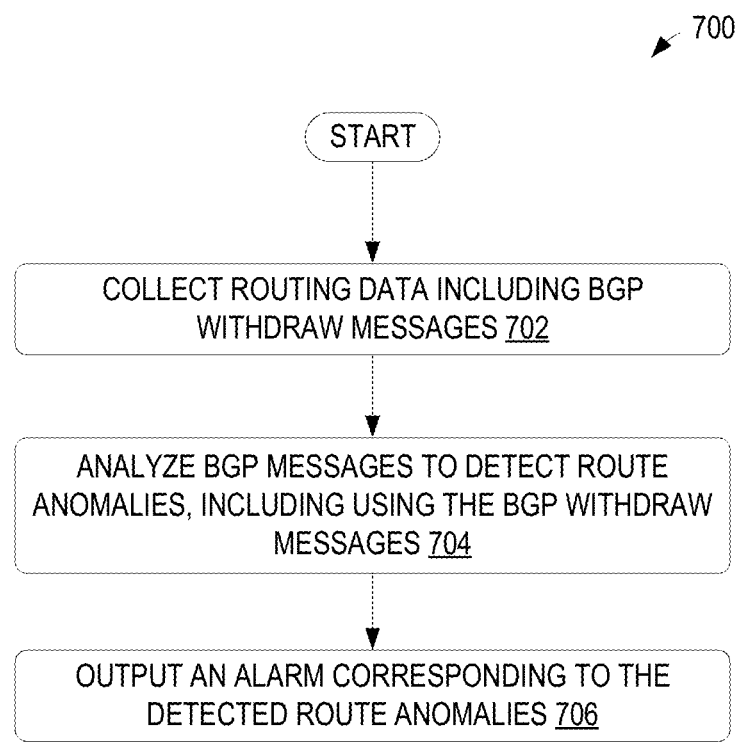
FIG. 7 is a flow chart of an example method for detecting routing anomalies using BGP withdraw messages.

FIG. 7 illustrates an example method 800 for detecting route anomalies using routing information in accordance with one or more of the implementations described herein. Method 700 may be performed by a control-plane based routing anomaly detection service, such as route anomaly detection and alarming service 108 of FIG. 1, in coordination with data sources such as BGP update data provider 106 and/or databases A-D (112, 114, 118, and 122) of FIG. 1.

At 702, the method includes collecting routing data including BGP withdraw messages. It is to be understood that the routing data may further include BGP announcement messages. The BGP withdraw and/or announcement messages may include messages for a targeted prefix of an Autonomous System (AS) of the Internet. At 704, the method includes analyzing the BGP messages to detect route anomalies, where at least the BGP withdraw messages are used for the analysis. In some examples, BGP withdraw and announcement messages may be used for the analysis. Examples of analysis that may be performed include, but are not limited to, those described above and in more detail with respect to FIG. 2. At 706, the method includes outputting an alarm corresponding to the detected route anomalies. The alarm may be selectively output in some examples, based upon conditional information, such as a classification or other analysis of the route anomalies. For example, as described above in more detail with respect to FIGS. 1 and 2, information corresponding to detected route anomalies may be correlated with real-time network traffic data in order to classify the route anomalies and determine if the anomalies are urgent in light of conditions/parameters set by a user.

Figure 8:
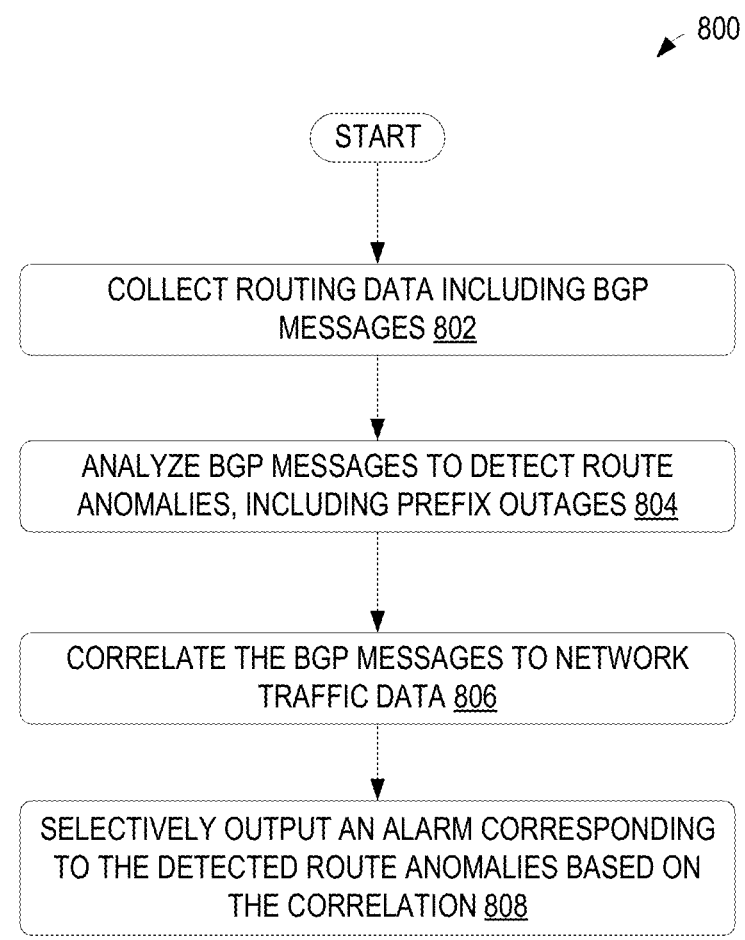
FIG. 8 is a flow chart of another example method for detecting and outputting alerts for routing anomalies based on a correlation of BGP messages to network traffic data.

FIG. 8 illustrates another example method 800 for detecting route anomalies using routing information in accordance with one or more of the implementations described herein. Method 800 may be performed by a control-plane based routing anomaly detection service, such as route anomaly detection and alarming service 108 of FIG. 1, in coordination with data sources such as BGP update data provider 106 and/or databases A-D (112, 114, 118, and 122) of FIG. 1.

At 802, the method includes collecting routing data including BGP messages (e.g., BGP announcement and/or withdraw messages). The BGP messages may include messages for a targeted prefix of an Autonomous System (AS) of the Internet. At 804, the method includes analyzing the BGP messages to detect route anomalies including prefix outages. Examples of analysis that may be performed include, but are not limited to, those described above and in more detail with respect to FIG. 2, such as performing computations on the BGP messages, comparing the BGP messages to stored data, and/or other processing. The BGP messages may be analyzed in order to determine the presence of a prefix outage, an example of which is described above with respect to FIG. 3.

At 806, the method includes correlating the BGP messages to network traffic data. For example, as described in more detail with respect to FIG. 2 and in reference to the route anomaly classification and alarming module 120 of FIG. 1, traffic data may be monitored and correlated with the detected anomalies to determine if the anomalies are significant enough to warrant alerting a user (e.g., based on user-defined parameters indicating a user's intent for the route anomaly detection). At 808, the method includes selectively outputting an alarm corresponding to the detected route anomalies based on the correlation. For example, the alarm may be output if the correlation of the BGP messages to network traffic data indicates that the route anomaly is a material event (e.g., is occurring while another relevant traffic anomaly is also detected). Alternatively, the alarm may be suppressed if the correlation of the BGP messages to network traffic data indicates that the route anomaly is not a material event (e.g., is occurring while a network is operating within a threshold of normal operation parameters).

Figure 9:
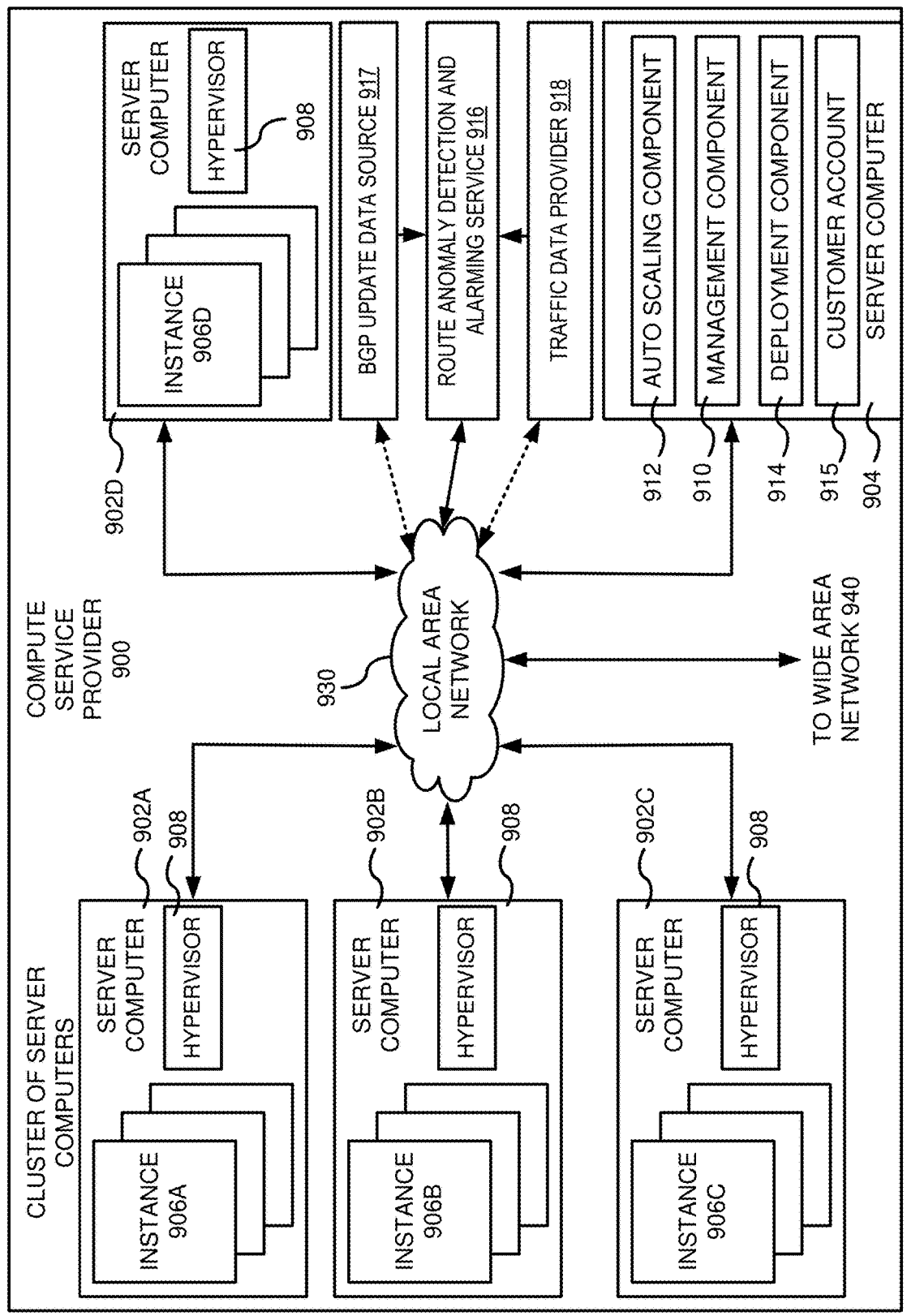
FIG. 9 is an example system diagram showing a plurality of virtual machine instances running in a multi-tenant environment.

FIG. 9 is a computing system diagram of a network-based compute service provider 900 that illustrates one environment in which embodiments described herein can be used. By way of background, the compute service provider 900 (i.e., the cloud provider) is capable of delivery of computing and storage capacity as a service to a community of end recipients. In an example embodiment, the compute service provider can be established for an organization by or on behalf of the organization. That is, the compute service provider 900 may offer a "private cloud environment." In another embodiment, the compute service provider 900 supports a multi-tenant environment, wherein a plurality of clients operate independently (i.e., a public cloud environment). Generally speaking, the compute service provider 900 can provide the following models: Infrastructure as a Service ("IaaS"), Platform as a Service ("PaaS"), and/or Software as a Service ("SaaS"). Other models can be provided. For the IaaS model, the compute service provider 900 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 900 using networked client devices, such as desktop computers, laptops, tablets, smartphones, etc. running web browsers or other lightweight client applications. Those skilled in the art will recognize that the compute service provider 900 can be described as a "cloud" environment.

Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described herein as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The particular illustrated compute service provider 900 includes a plurality of server computers 902A-902D. While only four server computers are shown, any number can be used, and large centers can include thousands of server computers. The server computers 902A-902D can provide computing resources for executing software instances 906A-906D. In one embodiment, the instances 906A-906D are virtual machines. As known in the art, a virtual machine is an instance of a software implementation of a machine (i.e. a computer) that executes applications like a physical machine. In the example of virtual machine, each of the servers 902A-902D can be configured to execute a hypervisor 908 or another type of program configured to enable the execution of multiple instances 906 on a single server. Additionally, each of the instances 906 can be configured to execute one or more applications.

The compute service provider 900 further includes a route anomaly detection and alarming service 916, which may include and/or be an example of the route anomaly detection and alarming service 108 of FIG. 1. Although illustrated as an additional component of the compute service provider in FIG. 9, in other examples, the route anomaly detection and alarming service 916 may be incorporated in one of the server computers 902A-902D. The route anomaly detection and alarming service 916 may communicate with the local area network 930 in order to receive data (e.g., BGP update data, such as BGP update data from BGP update data source 917 and/or traffic data, such as traffic data from traffic data provider 918) for detecting route anomalies in the network 930. In other examples, the route anomaly detection and alarming service may receive data directly from the BGP update data source 917 and/or the traffic data provider 918. In some examples, the service 916 may additionally or alternatively communicate with the local area network 930 to communicate alarms regarding route anomalies. For example, a user of the route anomaly detection and alarming service may be associated with one or more of the server computers 902A-902D.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 904 can be reserved for executing software components for managing the operation of the server computers 902 and the instances 906. For example, the server computer 904 can execute a management component 910. A client can access the management component 910 to configure various aspects of the operation of the instances 906 purchased by the client. For example, the client can purchase, rent or lease instances and make changes to the configuration of the instances. The client can also specify settings regarding how the purchased instances are to be scaled in response to demand. The management component can further include a policy document to implement client policies. An auto scaling component 912 can scale the instances 906 based upon rules defined by the client. In one embodiment, the auto scaling component 912 allows a client to specify scale-up rules for use in determining when new instances should be instantiated and scale-down rules for use in determining when existing instances should be terminated. The auto scaling component 912 can consist of a number of subcomponents executing on different server computers 902 or other computing devices. The auto scaling component 912 can monitor available computing resources over an internal management network and modify resources available based on need.

A deployment component 914 can be used to assist clients in the deployment of new instances 906 of computing resources. The deployment component can have access to account information associated with the instances, such as who is the owner of the account, credit card information, country of the owner, etc. The deployment component 914 can receive a configuration from a client that includes data describing how new instances 906 should be configured. For example, the configuration can specify one or more applications to be installed in new instances 906, provide scripts and/or other types of code to be executed for configuring new instances 906, provide cache logic specifying how an application cache should be prepared, and other types of information. The deployment component 914 can utilize the client-provided configuration and cache logic to configure, prime, and launch new instances 906. The configuration, cache logic, and other information may be specified by a client using the management component 910 or by providing this information directly to the deployment component 914. The instance manager can be considered part of the deployment component.

Client account information 915 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, etc.

A network 930 can be utilized to interconnect the server computers 902A-902D and the server computer 904. The network 930 can be a local area network (LAN) and can be connected to a Wide Area Network (WAN) 940 so that end users can access the compute service provider 900. It should be appreciated that the network topology illustrated in FIG. 9 has been simplified and that many more networks and networking devices can be utilized to interconnect the various computing systems disclosed herein.

Figure 10:
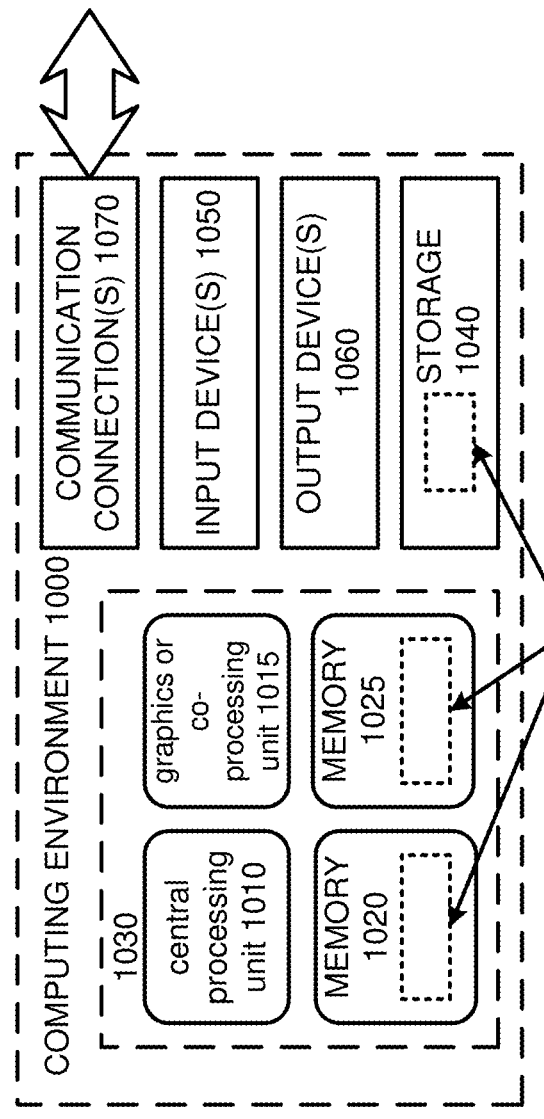
FIG. 10 depicts a generalized example of a suitable computing environment in which the described innovations may be implemented.

FIG. 10 depicts a generalized example of a suitable computing environment 1000 in which the described innovations may be implemented. For example, the computing environment 1000 may be an example of a computing environment in which the BGP update data provider 104 and/or the route anomaly detection and alarming service 108 of FIG. 1 and/or other services, modules, and/or devices described herein are implemented (e.g., to perform the methods described herein, including method 200 of FIG. 2, method 700 of FIG. 7, and/or method 800 of FIG. 8). The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. One or more non-transitory computer-readable media comprising computer-executable instructions that, when executed, cause a computing system to perform a method comprising:

collecting, in real-time, routing data including Border Gateway Protocol (BGP) withdraw messages and BGP announcement messages for a targeted prefix of an Autonomous System (AS) of the Internet;

processing the routing data to filter and normalize the BGP withdraw and announcement messages;

comparing the filtered and normalized BGP withdraw and announcement messages to stored monitored data to detect a route anomaly;

correlating data corresponding to the detected route anomaly to monitored network traffic data to classify the detected route anomaly; and selectively outputting an alarm for the detected route anomaly based on the corresponding classification, wherein different types of alarms are output for different classifications of route anomalies.

2. The one or more non-transitory computer-readable media of claim 1, wherein the detected route anomaly includes a prefix outage, a hijack, or a route leak corresponding to the targeted prefix, wherein the alarm is stored in a respective table for the corresponding classification of the route anomaly.

3. The one or more non-transitory computer-readable media of claim 1, wherein information relating to the targeted prefix is included in the stored monitored data, and wherein comparing the filtered and normalized BGP withdraw and announcement messages to the stored monitored data comprises detecting changes between the information relating to the targeted prefix included in the stored monitored data and the filtered and normalized BGP withdraw and announcement messages corresponding to the targeted prefix.

4. The one or more non-transitory computer-readable media of claim 1, wherein the alarm includes annotated user impact information and event location information for the detected route anomaly.

5. The one or more non-transitory computer-readable media of claim 1, wherein the method further comprises suppressing the alarm if the detected route anomaly is classified as being below a user-set urgency threshold based on the correlation of the route anomaly with the monitored network traffic data.

6. A method comprising:

collecting routing data including Border Gateway Protocol (BGP) messages for a targeted prefix of an Autonomous System (AS);

analyzing the BGP messages to detect a route anomaly, wherein analyzing the BGP messages includes extracting and analyzing BGP withdraw messages from the BGP messages;

classifying the detected route anomaly based on a correlation of the detected route anomaly with network traffic and performance data; and outputting an alarm corresponding to the detected route anomaly, the alarm being selected from a plurality of types of alarms based on the classifying of the detected route anomaly.

7. The method of claim 6, wherein collecting routing data comprises collecting raw routing data files from one or more third-party data providers.

8. The method of claim 7, further comprising normalizing the raw routing data files by decoding the raw routing data files, filtering out BGP updates for non-targeted prefixes, and storing BGP announcement and withdraw messages to a database.

9. The method of claim 8, wherein the network traffic and performance data includes internally monitored data relating to the AS, and wherein classifying the detected route anomaly includes comparing the BGP announcement and withdraw messages stored in the database to the internally monitored data relating to the AS to detect changes associated with the targeted prefix.

10. The method of claim 9, wherein the internally monitored data includes internal routing data identifying prefixes that are announced to the Internet.

11. The method of claim 9, further comprising storing the alarm in a selected alarm table of a plurality of alarm tables, each of the plurality of alarm tables associated with a different one of the plurality of types of alarms.

12. The method of claim 6, wherein the detected route anomaly is determined to have a classification above an urgency threshold, and wherein the alarm is suppressed for route anomalies that are determined to have a classification below the urgency threshold.

13. The method of claim 6, wherein the alarm includes annotated user impact information and event location information for the detected route anomaly.

14. The method of claim 6, wherein the detected route anomaly includes a prefix outage, in which the targeted prefix is no longer reachable on the Internet.

15. The method of claim 6, wherein the AS is a first AS, and wherein the detected route anomaly includes a hijack, in which the targeted prefix is advertised by a second AS that is different from the first AS.

16. The method of claim 6, wherein the detected route anomaly includes a route leak, in which an unexpected BGP path to the targeted prefix is detected.

17. A system, comprising:
a route collection and preprocessing module comprising first instructions stored on one or more storage devices and executable by a processor to collect and normalize routing data, the normalized routing data including normalized BGP announcement and withdraw messages corresponding to a targeted prefix of an Automated Service (AS) of the Internet;
a route anomaly detection module comprising second instructions stored on the one or more storage devices and executable by the processor to detect a route anomaly based on the normalized BGP announcement and withdraw messages; and
a route anomaly classification and alarming module comprising third instructions stored on the one or more storage devices and executable by the processor configured to correlate real-time network traffic data with the detected route anomaly to determine a classification of the route anomaly and selectively output an alarm corresponding to the classification of the route anomaly based on the correlation, wherein the classification of the route anomaly includes a determination of whether the route anomaly is benign or material and a determination of a type of the route anomaly.

18. The system of claim 17, further comprising an internal routing database storing data corresponding to monitored ASs and prefixes and AS relationships, wherein the route collection and preprocessing module is configured to filter the BGP announcement and withdraw messages based on the data of the internal routing database.

19. The system of claim 18, wherein the route anomaly detection module is configured to detect route anomalies by identifying differences between the BGP announcement and withdraw messages and the data of the internal routing database.

20. The system of claim 17, wherein the alarm includes a prefix outage alarm, a route hijack alarm, an unexpected prefix activity alarm, or a route leak alarm.

\* \* \* \* \*